Sept. 25, 1934.                  G. WEBER                  1,974,478

APPARATUS FOR PRODUCING BLOCKS OF CARBON DIOXIDE SNOW BY MEANS OF LIQUID $CO_2$

Filed Dec. 16, 1930         2 Sheet -Sheet 1

Guglielmo Weber
INVENTOR;

Sept. 25, 1934. G. WEBER 1,974,478
APPARATUS FOR PRODUCING BLOCKS OF CARBON DIOXIDE SNOW BY MEANS OF LIQUID $CO_2$
Filed Dec. 16, 1930 2 Sheets-Sheet 2
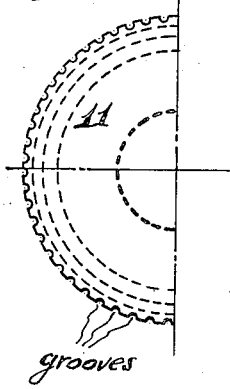
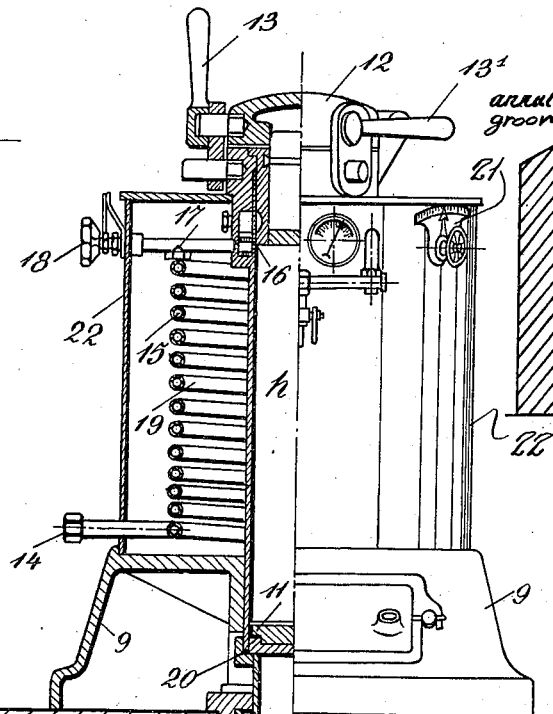
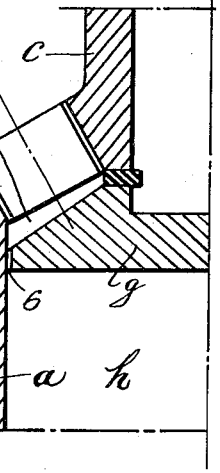
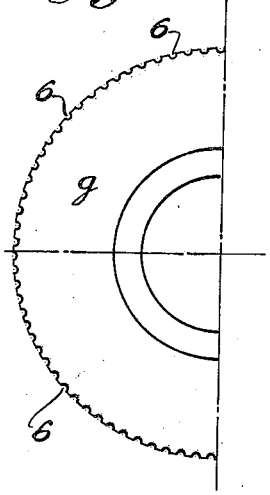
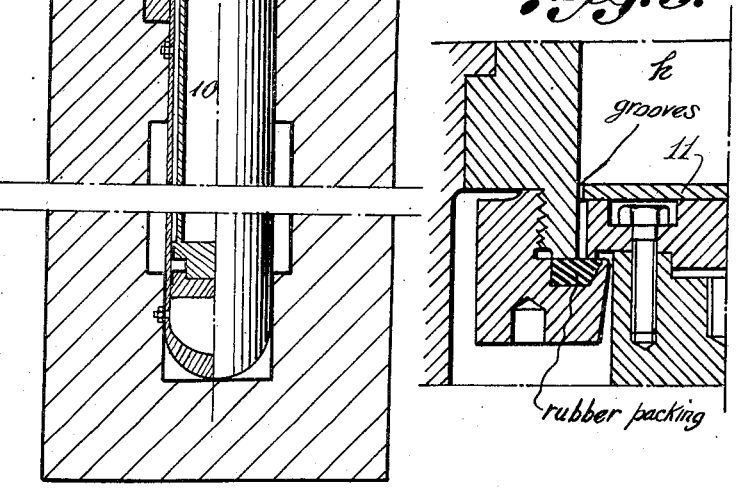
Guglielmo Weber
INVENTOR
his Attorney Patented Sept. 25, 1934

1,974,478

UNITED STATES PATENT OFFICE 1,974,478

APPARATUS FOR PRODUCING BLOCKS OF CARBON DIOXIDE SNOW BY MEANS OF LIQUID $CO_2$

Guglielmo Weber, Pergine Valdarno, Italy

Application December 16, 1930, Serial No. 502,637
In Italy December 19, 1929

5 Claims. (Cl. 62—121)

The present invention relates to apparatus for producing from liquid $CO_2$, blocks or discs of solidified carbon dioxide snow which evaporates slowly, and produces an intense dry cold reaching a temperature as low as 70° centigrade below zero.

Essentially, the invention consists in the formation of the carbon dioxide snow as well as the compression thereof within the same chamber into which the liquid $CO_2$ is suitably injected.

More particularly, the invention consists in a chamber into which the liquid $CO_2$ is introduced through a pipe which is provided with a cleansing pin suitably operable to regulate the opening of the pipe outlet and thus to prevent clogging of the pipe.

Within the chamber the injected liquid $CO_2$ expands, solidifying into snow-flakes, which fall to the bottom of the chamber and are compressed therein. The unsolidified portion of the $CO_2$ escapes as gas through special apertures in order to pass into a second chamber, or into a serpentine pipe, for the purpose of effecting cooling of the machine or the preliminary cooling of the $CO_2$ entering the expansion chamber. In this manner the cooling of the $CO_2$ and of the machine may be effected.

It is well-known that the colder the space within which solidification of the liquid $CO_2$ occurs, or the colder this product is, the greater will be the production of snow, and in accordance with my invention I cool this space, or the product, by introducing thereinto liquid $CO_2$ cooled to the utmost possible degree, so that a considerable portion of the liquid entering the chamber produces snow, while another limited portion escapes in a gaseous state into the casing surrounding the chamber. The gas then passes into a third chamber and flows about the machine wherein there is a serpentine pipe, so that the latter is cooled, and with it the liquid $CO_2$ flowing through the serpentine pipe. In this manner the gas forms in the working chamber, the mass of snow for the production of the block of ice; or else it escapes through a counter-current serpentine pipe, containing a central pipe for the supply of the $CO_2$ to the expansion chamber. In either case the gas which escapes from the production chamber and cools the casing and the serpentine pipe, is caused to pass through a special conduit where it may be recovered as $CO_2$ in a gaseous state.

Another characteristic feature of the invention is that a portion of the chamber is movable, so that the quantity of snow produced in the chamber may be gauged and the formation of the block of ice be effected in the same chamber wherein the snow was formed.

The device will be more clearly understood from the following detailed description together with the acocmpanying drawings showing two embodiments of the invention.

In said drawings—

Figure 2 is an elevational view partly in section of the invention adapted particularly for the production of large ice blocks.

Figure 3 is a vertical section through a part of the piston $g$ of Figure 1;

Figure 4 is a plan view of a part of the piston $g$ of Figure 1;

Figure 5 is a vertical section through a part of the piston head of Figure 2;

Figure 6 is a plan view of the piston head of Figure 2.

Figure 1:
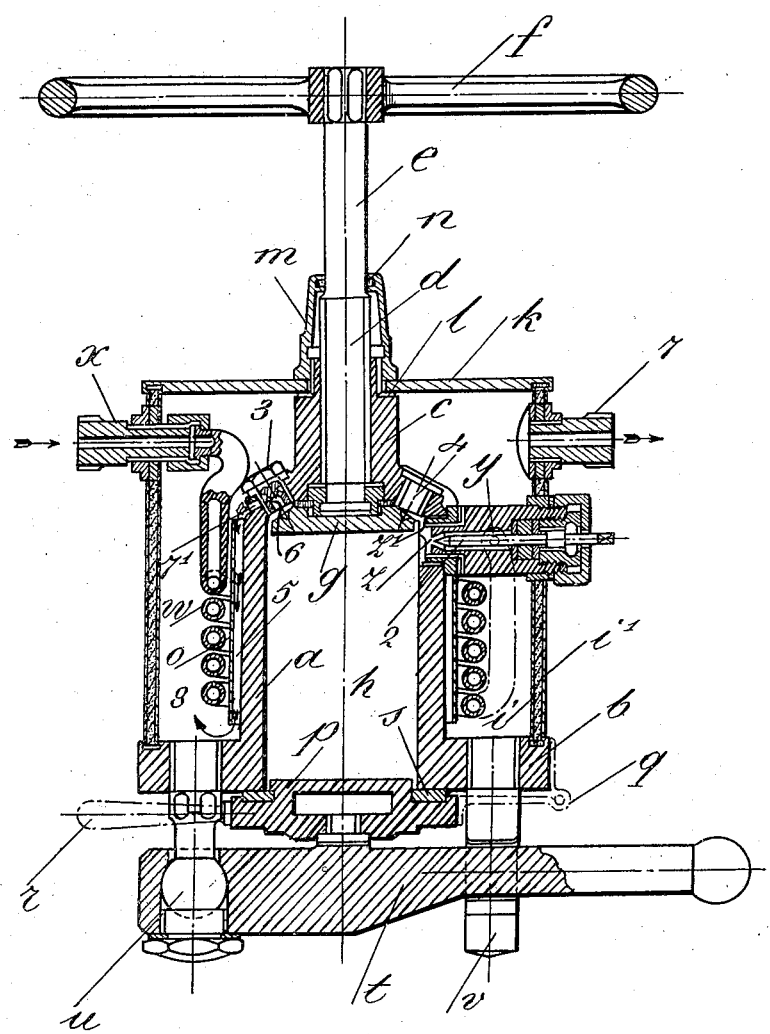
Figure 1 is a substantially vertical sectional view of a form of apparatus especially adapted for the formation of small ice blocks.

Referring to the drawings and particularly to the form illustrated in Figure 1, $a$ denotes a bell shaped housing provided with a broad lateral base flange $b$. The upper portion of the housing $a$ comprises a conically formed shoulder which terminates in an upstanding neck portion $c$. The bore of the neck $c$ is internally threaded to accommodate the threaded portion $d$ of a stem $e$ which at its upper end is provided with a hand wheel $f$. The lower end of the stem $e$ beyond the threads $d$ carries a disc or valve plate $g$ having a diameter corresponding with that of the chamber $h$ formed by the interior of the housing $a$. The disc $g$ is provided with radial grooves 6 terminating in an annular groove for the purpose of directing the escape of the gases towards the passages disposed in plugs 3 more fully hereinafter referred to.

The upper face of the flange $b$ is provided with an annular groove to accommodate suitable packing to form a seat for the lower end of a tubular member comprising spaced inner and outer casings $i$ and $i'$ respectively, and an intermediate filler of insulating material. The upper end of the tubular member seats against a packing arranged in a groove in the under face of a cap or cover piece $k$, the latter having a center opening to permit the reduced upper end of the neck portion $c$ to project therethrough. The wall of the center opening in the cap $k$ rests upon a shoulder $l$ on the neck $c$ and carries a bushing $m$ projecting upwardly to embrace the stem $e$, a packing element $n$ being disposed in the bushing to engage the stem to prevent the formation of any congealed matter due to moisture of the air.

The bell shaped housing $a$ is provided with an externally disposed jacket $o$ which is spaced from the adjacent wall of the housing to form a complete air space between the two surfaces. The lower or open end of the bell shaped housing $a$ is closed by a cover plate $p$ movable into and out of closed position on a hinge connection $q$ carried on the periphery of the flange $b$. The plate $p$ has a handle $r$ and a raised center portion and at the base of the upper side thereof is an annular packing piece $s$ which seats against the under face of the flange $b$ at the edge of the chamber $h$, and forms a hermetic seal between the plate $p$ and housing $a$. The plate is held in closed position by means of lever $t$ universally mounted on a ball joint $u$ projecting below the flange $b$ at one side thereof, the free end of the lever $t$ being engaged or hooked in a hook $v$ depending from beneath the other side of the flange $b$. This arrangement allows the lever $t$ to be unhooked from hook $v$ and swung downwardly and outwardly about the ball joint $u$ to release the cover plate $p$ and permit it to be lowered.

Coiled about the jacket $o$ is a helical pipe $w$ which has its inlet in a fixture $x$, and which terminates at $y$ in a mouth piece or nozzle $z$ comprising a bore and needle 2, the latter being manipulated from the outside of the device for the purpose of keeping the inlet open during operation of the machine. The needle 2 also regulates the size of the annular opening at the inlet to the pipe $w$. Directly over the place where the inlet of the pipe is arranged there is a screen $z'$ in the conical portion of the housing $a$ for the purpose of directing the jet downwardly.

The conical portion of the housing $a$ carries four plugs 3, three thereof being provided with a filter and the fourth 4 takes the form of a copper safety element adapted to open under excessive pressure within the housing $a$.

The filters in the plugs 3 are provided with suitable passages to establish communication between the chamber $h$ and the space 5 under the jacket $o$. To carry out this purpose the small blocks which constitute the bodies of the plugs are provided with special grooves 6, which permit free passage of the gases, any solid particles however being withheld by the blocks just mentioned. A second mouth piece 7 is mounted in the wall $i$, $i'$ to form an outlet for $CO_2$ gas. A packing $s'$ is interposed between the piston $g$ and the neck $c$ to provide a tight seal therefor.

The operation of the device described in the foregoing is as follows:

Liquid $CO_2$ is fed from an inverted container into the mouth piece $x$ and then through the helical pipe $w$ to the pipe $y$ and nozzle $z$ which is regulated by means of the needle 2.

The liquid $CO_2$ passes out of the serpentine pipe into $y$ and then expands through the pipe $z$ into the chamber $h$ of the bell $a$. There, owing to the familiar physical phenomenon, snowflakes are formed, which fill the bottom of the chamber, where they settle evenly. The portion of gas not having solidified into flakes escapes through the grooves 6 against the filters of the plugs 3. Thereupon said gas passes through the passages $7^1$ in order to enter the chamber 5 whence, following the direction of the arrows, it enters space 8 to issue from the mouth 7 as $CO_2$.

This gas having escaped from the chamber $h$ is at an extremely low temperature, so that in bathing the outer walls of the bell $a$ and those of the serpentine pipe $w$ it cools both in such a manner as not to disturb the low temperature necessarily prevailing in the chamber $h$ and to impart to the serpentine pipe the possibility of initially cooling the liquid $CO_2$ during its passage, which liquid then enters the expansion chamber already cooled, contributing thereby to the natural physical formation of snow by expansion.

The filters in the plugs 3 serve to hold back the solid particles carried along with the escaping gases.

After a certain working period (the nozzle $z$ for the admission of liquid $CO_2$ being closed) it is possible to ascertain the quantity of snow obtained by rotating the rod $e$ so as to cause the lowering of the small block $g$ which on being lowered gradually compresses the mass of snow. Thus, by reading a special graduation marked on the rod $e$ and showing the extent of its descent, the indication of the contents of snow in chamber $a$ will be obtained. It is characteristic of the invention that by still further compressing the snow, as by further rotation of the screw, the block of solid $CO_2$ ice will be obtained within the same chamber $h$ where the formation of the snow took place.

On the lever $t$ being operated the cover plate $p$ is opened and the block of $CO_2$ ice falls, this being also due to the fact that the chamber $h$ is slightly conical.

Should any icicles form during these operations, obstructing the passage of the $CO_2$, said pipe may be cleaned by means of the needle 2 without interrupting the operation.

The apparatus might also function without any serpentine pipe, with the injection of $CO_2$ direct from the passage $y$ while it would also be possible to provide more than one pipe $z$ with pin 2 in chambers of increased capacity.

Should it be desired to obtain a greater degree of cooling of the liquid $CO_2$ passing through the supply piping, such piping might be caused to pass into another pipe within which the escaping gases should flow on leaving the working chamber.

The construction illustrated in Figure 2, like that shown in Figure 1, comprises a compression chamber $h$, preferably of cylindrical shape, in which the $CO_2$ snow is formed, collected and through compression converted into a block of ice. Chamber $h$ carried by base 9 is rigidly attached to the hydraulic cylinder 10 which co-operates with piston 11 to compress the $CO_2$ snow and form a block of $CO_2$ ice as described.

Contrary to what is stated as regards the case according to Fig. 1, the chamber in this second example is provided with an obturator 12 located at its upper part; this obturator is of a suitable type and readily operable by means of levers 13, $13^1$.

Around the chamber $h$ according to Fig. 2 is suitably disposed a double serpentine pipe, composed of two pipes, one within the other. Through the fitting 14 the liquid $CO_2$ flows into the inner pipe 15 and proceeds towards the pin 16 through the fitting 17. A valve 18 regulates the flow of $CO_2$ gas from the nozzle.

In the chamber $h$ there takes place the expansion of the $CO_2$ and the formation of snow-flakes which settle evenly and gradually at the bottom, that is, on the piston 11 of said chamber $h$. The unsolidified $CO_2$ escapes through the annular space between the outer pipe 19 and the inner one 15 and travelling along this path, issues from the corresponding space in the fitting 14. Along this path said gas cools the inner pipe 15 and consequently the $CO_2$ circulating therein, and then flows towards the pin 16.

In Fig. 2, as in Fig. 1, the characteristic feature is that the snow is compressed in the same chamber wherein it is formed, by means of a movable element advancing within said chamber. In Fig. 2, however, the compression which in Fig. 1, is effected by means of the upper screw, turned manually, is effected through the medium of an hydraulic cylinder, or the like acting from below.

The hydraulic piston 11 and cylinder 10 are preferably of different diameters and have interposed between them a packing or gland 20 to ensure hermetic closure of the chamber $h$ during the snow forming period. The position of the packing 20 is such that it is subject to compressive strains only.

An index-gauge 21 on the external casing 22 that encloses the serpentine pipe indicates the position of the needle 2 in the nozzle $z$ and, consequently, indicates the quantity of liquid $CO_2$ flowing into chamber $a$.

Glycerine may be put into the cylinder 10 for the purpose of preventing the freezing of the water.

This second type of apparatus will of course also be provided with regulating pipes having a cleansing needle, safety-valves, discharge faucets, etc., as indicated in the form of Fig. 1.

The $CO_2$ snow obtained with apparatus of the kind described, proves to be of greater specific weight than that presented by ice obtained either through the compression of snow or through the direct freezing of the liquid, this being due to the fact that—according to the invention—the snow is compressed in the same chamber wherein it is formed, that is, it is compressed in the same stratification as laid by the deposited snow. Thus, a $CO_2$ ice is obtained characterized by greater hardness and fewer crevices, so that the actual development of the external surface is reduced to a minimum.

It should be understood that the drawings constitute but a schematic form of example, given solely by way of a practical showing of the invention, it being possible for said invention to be varied as to forms and arrangements without however departing from the scope of the concept underlying said invention.

Having now particularly described and ascertained the nature of my said invention and in what manner the same is to be performed, I declare that what I claim is:—

1. An apparatus for producing carbon dioxide ice blocks from liquid $CO_2$ comprising a central chamber in which the liquid $CO_2$ expands into carbon dioxide snow, a second chamber embracing the first and having one end open, a third chamber enclosing the first two chambers and being in communication with the second through the open end thereof, a helically shaped conduit disposed in the third chamber and coiled about the second chamber to lead the liquid $CO_2$ into the first chamber, and means to permit the unsolidified liquid $CO_2$ to escape as a gas into the second chamber to cool the first and then into the third chamber to cool the helically shaped conduit.

2. An apparatus for producing carbon dioxide ice blocks from liquid $CO_2$, comprising an expansion chamber in which the liquid $CO_2$ expands into $CO_2$ snow, a hinged closure for the open lower end of the chamber, packing for the closure, a handle for the closure, a lever universally hinged and adapted to hold the closure in closed position, and a hook to receive the free end of the lever to hold the same in closed position.

3. An apparatus for producing blocks of carbon dioxide ice from liquid $CO_2$, comprising a casing containing a central snow forming chamber and a cooling chamber surrounding said central chamber, means for admitting liquid $CO_2$ in controlled quantities to said central chamber, a movable abutment at one end of said central chamber, discharge means leading therefrom to said surrounding cooling chamber, a piston having peripheral grooves to allow of the passage of $CO_2$ gas formed in the central chamber, said grooved piston co-operating with the side walls of the said central chamber to prevent said grooves from becoming clogged, and means associated with said discharge means for filtering the gas passing through said grooves.

4. An apparatus for producing blocks of carbon dioxide ice from liquid $CO_2$, comprising a casing containing a central conical compression chamber receiving the $CO_2$ snow, and a cooling chamber surrounding said central chamber, a movable abutment at the end of the conical compression chamber having the greatest diameter, a piston movable within said central chamber from the end thereof of smallest diameter toward said abutment to compress the $CO_2$ snow and deliver the ice formed, means for admitting controlled quantities of liquid $CO_2$ into the compression chamber and means for supplying liquid $CO_2$ to said chamber through said admitting means, whereby the conical chamber causes the snow to settle very compactly and upon compression and delivery of the ice block the latter readily disengages from the side walls of the compression chamber due to the conical construction thereof.

5. An apparatus for producing blocks of carbon dioxide ice from liquid $CO_2$, comprising a casing containing a central snow forming chamber having a seat for a packing at one end thereof and a cooling chamber surrounding said central chamber, a packing on said seat, a movable abutment at the other end of said central chamber, a piston disposed in said central chamber and having one of its faces engageable with said packing to hermetically seal the central chamber at that point, said piston being movable away from the packing toward the abutment, whereby said packing is subjected to compression only and only during the snow forming period and relieved of pressure during the pressing period, means for admitting controlled quantities of liquid $CO_2$ into the said central chamber and means for supplying liquid $CO_2$ to said chamber through said admitting means.

GUGLIELMO WEBER.